United States Patent [19]  [11] 4,057,808
Shafer  [45] Nov. 8, 1977

[54] RECORDING APPARATUS
[75] Inventor: Donald E. Shafer, Littleton, Colo.
[73] Assignee: Honeywell Inc., Minneapolis, Minn.
[21] Appl. No.: 692,131
[22] Filed: June 2, 1976
[51] Int. Cl.$^2$ .......................... G01D 9/42; B41B 13/00
[52] U.S. Cl. ................................ 346/107 R; 346/108; 354/5
[58] Field of Search ............... 346/107 R, 108; 354/4, 354/5

[56] References Cited
U.S. PATENT DOCUMENTS

| 2,891,166 | 6/1959 | Piety | 346/108 X |
| 3,116,963 | 1/1964 | Kiyasu et al. | 346/107 R |
| 3,626,423 | 12/1971 | Ameen | 346/107 R |
| 3,701,990 | 10/1972 | Tuttle | 346/107 R X |
| 3,952,311 | 4/1976 | Lapeyre | 346/107 R X |
| 4,000,495 | 12/1976 | Pirtle | 354/5 X |

Primary Examiner—George H. Miller, Jr.
Attorney, Agent, or Firm—Laurence J. Marhoefer; Lockwood D. Burton

[57] ABSTRACT

A recording apparatus includes a plurality of Xenon flash tubes and a separate enclosure for each of said flash tubes. Each enclosure is provided with a slit through which light from the associated flash tube emerges to form a relatively small line segment. The slits are all located in a recording plane and may be disposed in an H-shaped or C-shaped recording array, as desired. When placed in cooperative relation with a moving light sensitive recording medium that is ultra-sensitive to a predominant wavelength of the light produced by said flash tubes, selective and appropriate flashing of said flash tubes produces dense analog time code and other traces on said recording medium.

6 Claims, 14 Drawing Figures

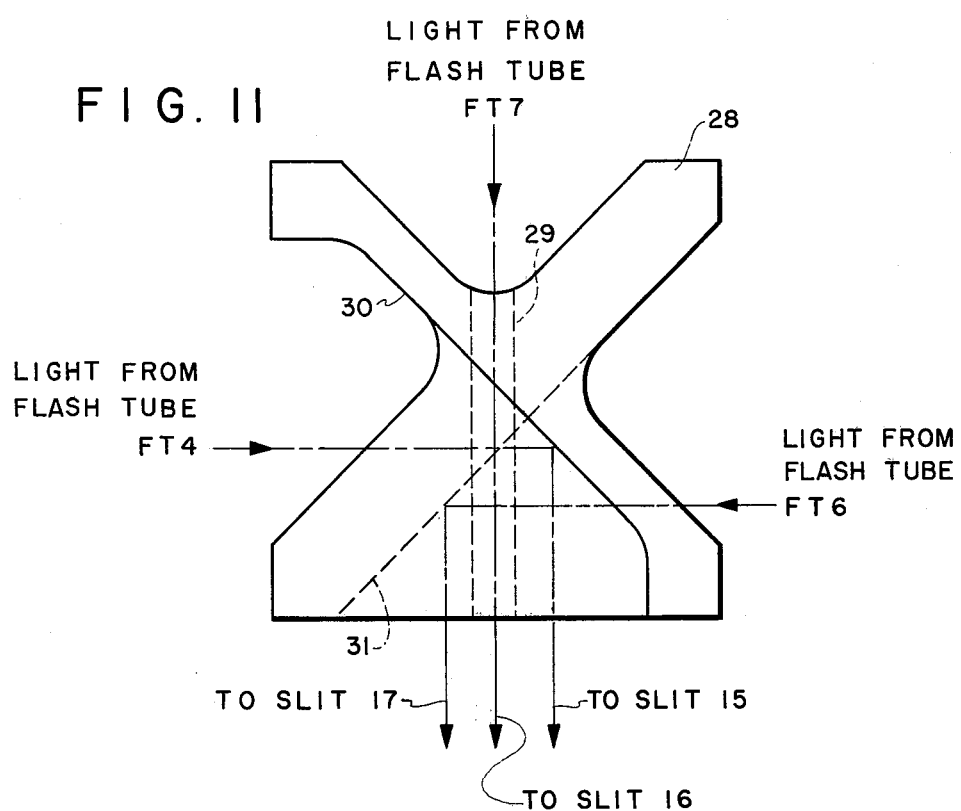
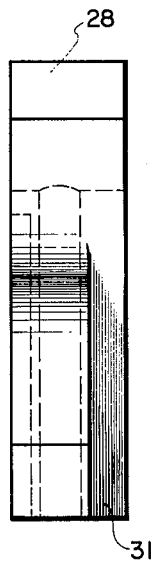
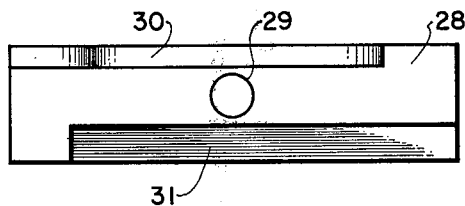
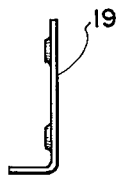
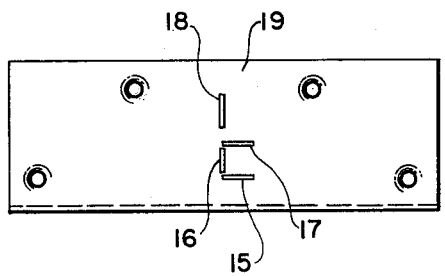
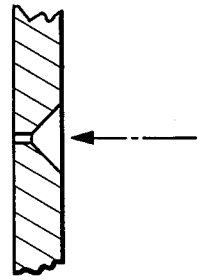

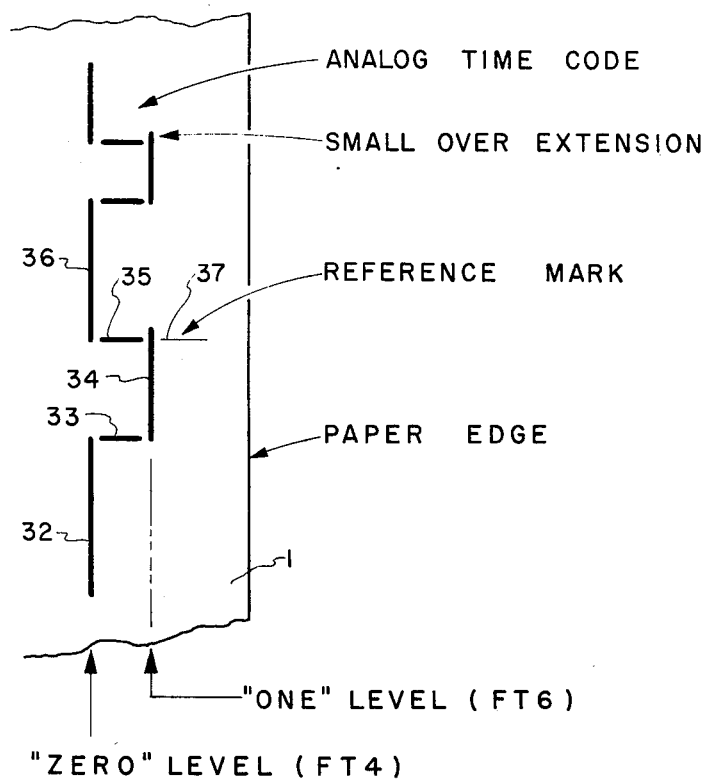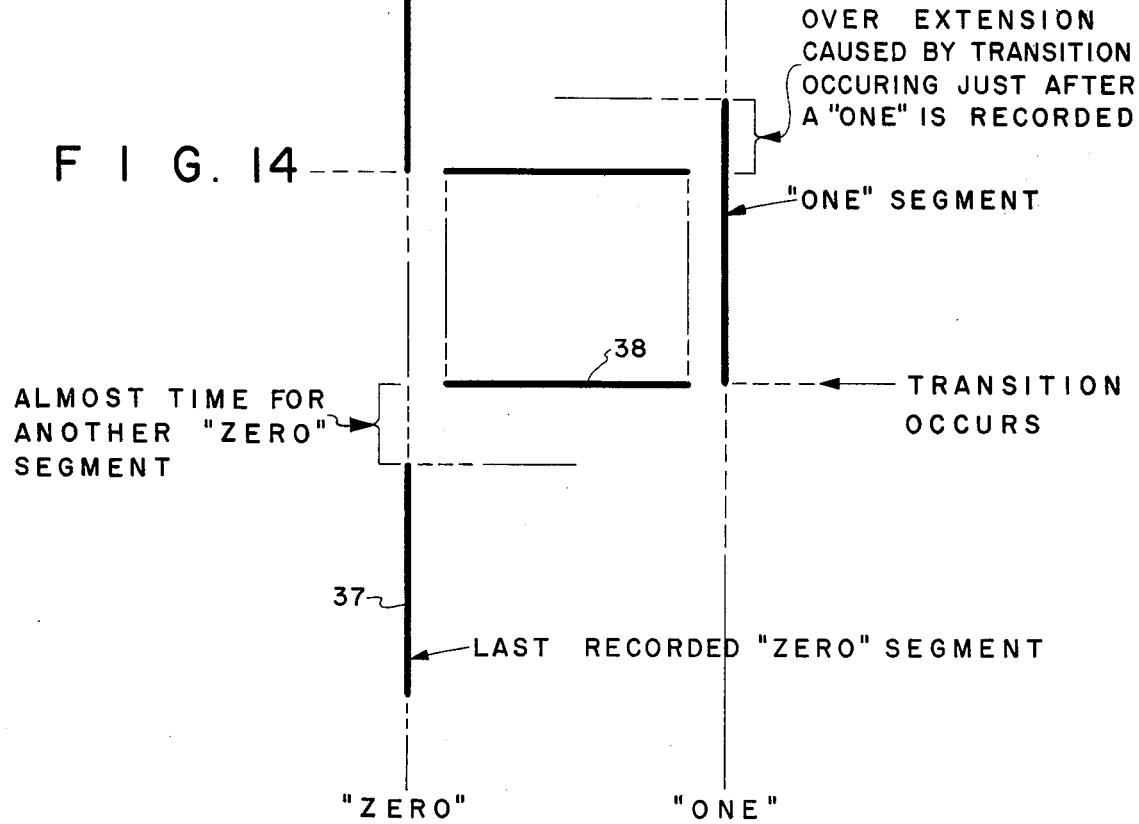

RECORDING APPARATUS

Subject matter disclosed but not claimed in this application is disclosed and is being claimed in my copending application bearing Ser. No. 616,609, filed Sept. 25, 1975.

BACKGROUND OF THE INVENTION

Field of the Invention

This invention relates to apparatus for recording multilevel segmented data signals such as analog time codes involving zero and one levels and time tick marks on a record medium.

Description of the Prior Art

Apparatus for printing letters, numerals and other symbols upon moving record surfaces are known in the prior art. An example of such apparatus is shown in U.S. Pat. No. 3,157,879 which shows a cathode ray tube for printing information by means of an electron beam upon an externally located heat sensitive surface. In this apparatus, an electron-permeable window is provided in the face of the cathode ray tube and an element of dielectric material having a plurality of channels adapted to pass electrons is arranged over the window. Electrical potentials are individually applied to the channels to control the selective passage by the channels of electrons. As the electron beam is swept over the window, the electrical potentials determines which of the channels can pass the electron beam to impinge upon the heat sensitive recording medium.

Another form of such apparatus is shown in U.S. Pat. No. 3,210,597 wherein the faceplate of a cathode ray tube is provided with a fiber-optics bundle for transmitting to a recording medium light produced internally of the cathode ray tube by the electron beam. The fiber-optics bundle is comprised of smooth fibers of transparent materials, such as glass. Such fibers transmit light with high efficiency by means of multiple internal reflections. Each fiber in an array or bundle transmits its light independently of adjacent fibers.

Still other forms of known prior art apparatus for printing or placing symbols upon a recording medium include closely spaced light emitting diodes and small arcing flash heads.

A disadvantage common to the cathode ray tube and light emitting diode forms of the prior art apparatus is the high cost of the apparatus. Thus, while the cathode ray tube arrangements provide proven technology, they are quite expensive. Light emitting diodes require a special array which in small quantities would be prohibitively expensive.

A further disadvantage of light emitting diodes is their low light output. Their use, therefore, would tend to result in marginal operation of the recording apparatus, particularly at higher recording or chart speeds, for example, several hundred centimeters per second. Moreover, point source light emitting diodes of the proper wavelength light output, for example, 360 nanometers, to match the sensitivity of the recording medium, are required. Such light emitting diodes are not commonly available. Fiber-optics cathode ray tubes and small arcing flash heads have these same disadvantages also. Additionally, while relatively inexpensive, small arcing flash heads emit large quantities of undesired electromagnetic radiations which result in undesired and in many cases intolerable radio frequency interference (RFI).

A less expensive and more desirable form of apparatus for printing and placing symbols on a recording medium, is disclosed in my copending application bearing Ser. No. 616,609, filed Sept. 25, 1975, and assigned to the assignee of the present invention. That form of apparatus includes three Xenon tubes and a separate tapered fiber optics bundle associated with each of the flash tubes. The fiber optics bundles concentrate the flash tube images to form relatively small line segments which are disposed in an H-shaped recording array. When placed in cooperative relation with a light sensitive recording medium that is ultrasensitive to a predominant wavelength of the light produced by said flash tubes, selective and appropriate flashing of said flash tubes produces dense analog time code and other traces on said recording medium.

The requirement in such apparatus, however, for a tapered fiber optics bundle for each of the flash tubes also leaves something to be desired from the standpoints of cost, light availability, reliability and maintainability.

SUMMARY OF THE INVENTION

It is an object of the present invention to provide an improved electronic flash apparatus for recording multilevel segmented data signals such as analog time codes, time tick marks or other indicia, which apparatus is inexpensive, is substantially free of undesired RFI radiation, and provides improved light availability, reliability and maintainability.

In accomplishing these and other objects, the recording apparatus of the present invention departs from the recording techniques known in the prior art by utilizing a light box matrix containing a plurality of gas filled flash tubes such as commercially available Xeonon flash tubes or other similar gas discharge tubes. The flash tubes have large illuminating power in the ultraviolet range compared to the illuminating power of light emitting diodes and arcing flash heads, and permit short recurrent illuminating periods. Each flash tube is mounted in a separate enclosure in the light box matrix and is coupled individually to a light sensitive recording medium through a separate path in the light box matrix. Each enclosure has at least one highly reflective internal surface and is light tight except for an associated recording slit. The several slits are appropriately arranged in an opaque plate or film forming a front wall portion of the light box matrix. In operative position the said plate or film is disposed adjacent the recording medium. Thus, light emerges through each of the slits from the flash tube associated therewith to the recording medium to form desired small line segments on the recording medium. Several such flash tubes and enclosures are provided to achieve a desired time code display array and including also, if desired, time tick or reference marks.

The apparatus of the present invention is characterized in its high writing speed, and in the illustrated embodiments involving recording of analog time codes features precise recording of the transition between zero and one levels. By employing gas discharge tubes having a large illuminating power and high recurrent illuminating speed, there is provided an inexpensive, easily maintainable, and reliable method, with more available light, for recording dense analog time code traces, reference marks and other indicia on the recording medium. Moreover, the arrangement is such that the light transmission from the gas discharge flash tubes is effected to the recording medium over an area which normally, in practice, is much smaller than a single flash tube. Another feature of the arrangement is that the flash tubes may be appropriately flashed only when the drive mechanism for operating the recording medium is in an active condition or ON.

BRIEF DESCRIPTION OF THE DRAWINGS

A better understanding of the present invention may be had from the following detailed description when read in connection with the accompanying drawings wherein:

FIGS. 7 and 8 are plan and end view, respectively, of a front plate utilized in the preferred embodiment of the light box matrix;

FIG. 9 is a cross sectional view of the plate shown in FIGS. 7 and 8 and illustrates the shape of the recording slits;

FIGS. 10, 11 and 12 are front, top and side views, respectively of a light guiding and reflecting member or component utilized in the preferred embodiment of the light box matrix;

FIG. 13 shows a typical analog time code record including time tick or reference marks that may be produced by the preferred embodiment of the invention; and FIG. 14 shows a worst case segment separation of the record produced by the said preferred embodiment.

DESCRIPTION OF THE PREFERRED EMBODIMENT

Figure 1:
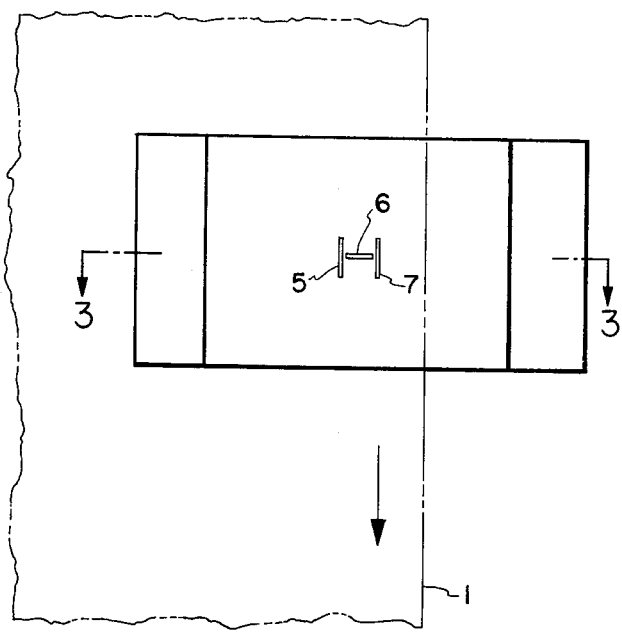
FIG. 1 is a front view of a light box matrix recording apparatus according to the present invention in which three slits provided in a thin plate are arranged in an H-shaped recording array.
Figure 2:
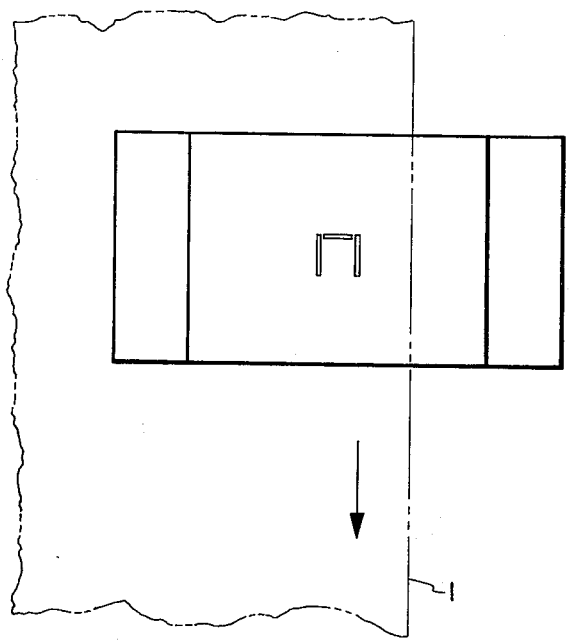
FIG. 2 is a front view of a modified light box matrix in which the slits are arranged in a C-shaped recording array.
Figure 3:
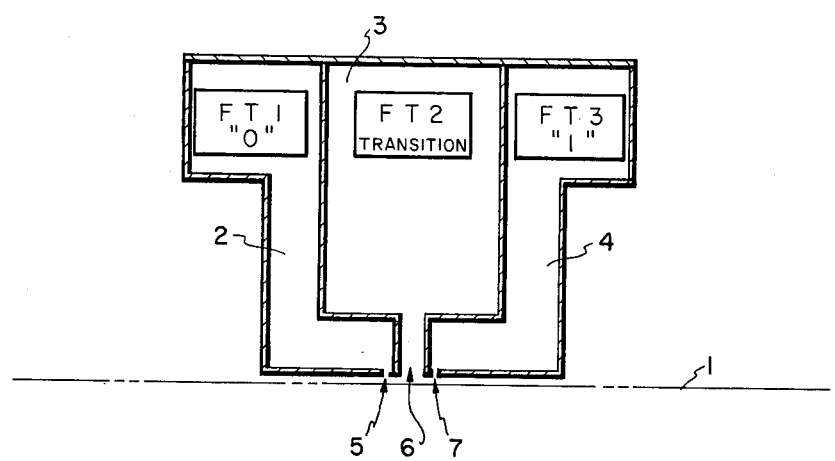
FIG. 3 is a top view of the light box matrix of FIG. 1, taken along the line 3—3.

The recording apparatus schematically illustrated in FIGS. 1, 2 and 3 includes three gas filled flash tubes designed FT1, FT2, and FT3.

Desirably the flash tubes are bulb type, pulsed Xenon flash tubes, and in particular, type 101B manufactured by the Electro-Optic Division of E.G. & C. INC. Such flash tubes when appropriately energized produce flashes of short duration and high radiance at a high pulse rate.

Each flash tube FT1, FT2 and FT3 is mounted in a separate enclosure 2, 3 and 4, respectively, as seen in FIG. 3, and is optically coupled to the light sensitive surface of a recording medium designated 1 (shown in phantom). The recording medium 1 desirably, although not necessarily, is arranged for vertical movement, upwardly or downwardly as seen in FIGS. 1 and 2, relatively to the flash tubes and their separate enclosures, and is ultra sensitive to a predominant wavelength produced by the flash tubes. The optical coupling includes three slits 5, 6 and 7 which are provided in adjacent sides of enclosures 2, 3 and 4, respectively. The enclosures with their respective slits and associated flash tubes provide a so-called light box matrix. Desirably, the internal surface of each enclosure is made of a highly reflective material having a mirror-like quality whereby to effect efficient transmission of the flash tube light through the associated slit. The slits associated with the enclosures of the light box matrix may be arranged to provide the recording H-shaped display array shown in FIG. 1, or the C-shaped display array of FIG. 2. The shape of the slits is such that each of the images of the flash tubes on the recording medium 1 is a line segment that is much narrower than the diameter of the associated flash tube. Typically, each slit segment is 0.005 inches (0.0127 cm) wide and 0.2 inches (0.508 cm) long. The maximum separation of the line segment images produced by flash tubes FT1 and FT2 and by the flash tubes FT2 and FT3 desirably is about 0.04 inches.

Suitable means (not shown) are provided for moving the recording medium 1 relatively to the recording display array, and for selectively and recurrently firing or pulsing the flash tubes FT1, FT2 and FT3 in accordance with analog time codes or other symbols and data to be recorded. Such means are known in the art and form no part of the present invention and are not shown in order to avoid unnecessary complication of the disclosure.

Figure 4:
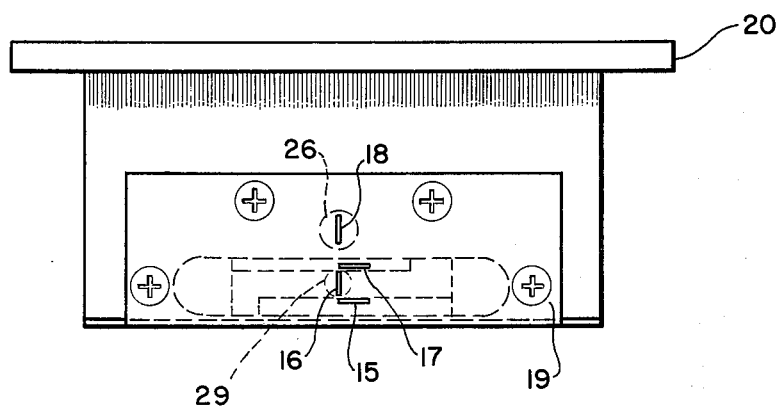
FIG. 4 is a front view of a further and preferred embodiment of the light box matrix recording apparatus of the present invention, having slits arranged in a C-shaped recording array and featuring a time tick or reference slit.

FIGS. 4 through 12 collectively illustrate a further and preferred embodiment of the invention. In this embodiment the interior of the light box matrix includes four separate but interconnecting spaces or enclosures in which four Xenon gas filled flash tubes are suitably mounted. Four recording slits are also provided through each of which slits light emerges from an individually associated one of the flash tubes. The flash tubes desirably also are of the type 101B manufactured by E. C. & G. INC. The enclosures in said matrix are provided with suitable electrical connecting sockets (not shown) in known manner, for receiving said flash tubes and for providing energizing electrical current to them. Terminal means (not shown) are also providing for connecting the flash tubes to appropriate external circuitry. Three of the slits, designated by numerals 15, 16 and 17 in FIG. 4, are arranged to provide a C-shaped recording array. If desired, these slits may be arranged to provide an H-shaped recording array. The fourth slit, designated by numeral 18, provides a time tick or reference mark.

The slits 15, 16, 17 and 18 desirably are formed in a thin L-shaped metal plate 19 as illustrated in FIGS. 7, 8 and 9. Desirably, in order to improve the transmission of light, each of the slits is provided with chamfered edges on the side of the plate 19 that faces the flash tubes. The angle of the chamfered surfaces to each other desirably is 90°, as shown in FIG. 9. The depth of the slit preferably is no greater than 0.010 inches (0.025 cm). The plate 19, as shown in FIGS. 7 and 8, desirably is provided with suitable openings through which suitable screws may be inserted for attaching the plate in position on the front of the light box matrix.

In operative recording position the front face of the light box matrix as shown in FIG. 4 would be mounted by means of a flange 20 having mounting openings 21 therein, closely spaced from the light sensitive surface of the recording medium (not shown). The direction of movement of the recording medium relatively to the light box matrix, as seen in FIG. 4, may be either to the right or left, as desired.

Figure 5:
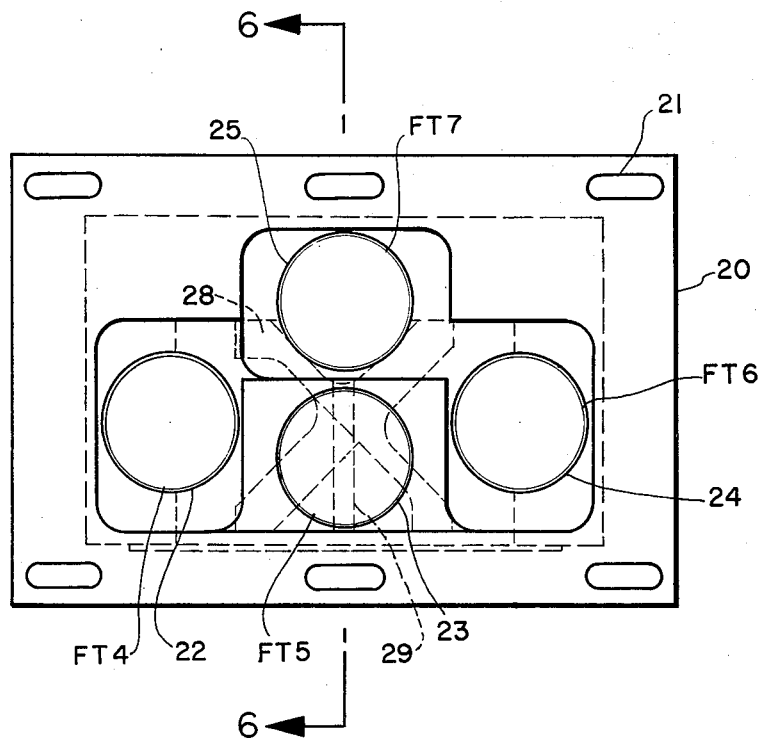
FIG. 5 is a side view of the light box matrix of FIG. 4, showing four flash tubes in place.

FIG. 5 is a view of the light box matrix of the preferred embodiment. As seen in FIG. 5, four enclosures, each of which contains a flash tube, are provided. The flash tubes have been designated FT4, FT5, FT6 and FT7. Flash tubes FT4, FT5, and FT6 are positioned in close fitting relation, in enclosures designated 22, 23 and 24, respectively. Light from flash tubes FT4, FT6 and FT7 emerges through slits 15, 17 and 16 respectively. The flash tube FT7 is positioned, again in close fitting relation, in an enclosure designated 25. Light from flash tube FT5 traverses a cylindrical opening 26 in the wall of the light box matrix and emerges through the slit 18.

Figure 6:
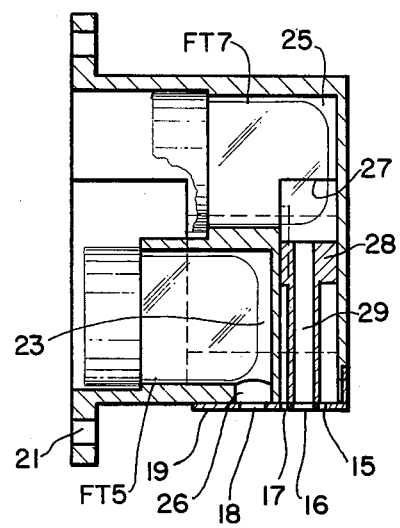
FIG. 6 is an end view of the light box matrix taken along the line 6—6 in FIG. 5.

FIG. 6 is a cross sectional view of the light box matrix illustrated in FIG. 5, taken along the lines A—A. As seen in FIG. 6, the light box matrix includes a rectangular compartment designated 27. Mounted in the compartment 27 is a light reflecting and guiding component or member 28 for directing or guiding light from the flash tubes FT4, FT6 and FT7 through respectively associated slits 15, 17 and 16 in the plate 19. Front, top and side views, respectively, of the member 28 are illustrated in FIGS. 10, 11 and 12.

As shown in FIGS. 10 and 11, the member 28 has a cylindrical opening designated 29. Light from the flash tube FT7 traverses this opening to emerge through the slit 16 in the plate 19.

The member 28, as shown in FIG. 10, is opaque and is irregularly and generally X-shaped. The member 28 includes two elongated polished mirror reflecting surfaces designated 30 and 31, the former having a negative slope and the latter a positive slope, as seen in FIG. 10. When inserted in the compartment 27, as seen in FIGS. 5 and 6, the member 28 isolates or shields the flash tubes FT4, FT6, and FT7 from each other. The close fit of the flash tubes in their respective enclosures, contributes to this result. Thus, as illustrated in FIG. 11, light from the flash tubes is directed to and allowed to emerge from only a respectively associated one of the slits 15, 16 and 17. Specifically, as shown, light from the flash tube FT7 traverses the cylindrical opening 29 to emerge from the slit 16; the reflecting surface 30 reflects light from the flash tube FT4 to the slit 15; and the reflecting surface 31 reflects light from the flash tube FT6 to the slit 17.

As noted in connection with the description of the embodiment of the invention illustrated in FIGS. 1, 2 and 3, the light traversing the slits 15, 16, 17 and 18 and hence, the images of the flash tubes on the recording medium are line segments that are much narrower than the diameter of the associated flash tube. Also, the dimensions of the slit segments and their separation may be the same, if desired. In the preferred embodiment of the invention, however, the slits, although of the same width, namely 0.005 inches (0.0127 cm) wide, are of different length. Specifically, the slits 15 and 17 are each 0.197 inches (0.500 cm) long, and the slit 16 is 0.130 inches (0.330 cm) long. The slit 18 is 0.200 inches (0.508 cm) long and is spaced 0.090 inches (0.223 cm) from the left end of slit 17, as seen in FIG. 4. The separation of the ends of slit 16 from the left ends of slits 15 and 17 is also 0.090 inches (0.223 cm).

OPERATION OF THE APPARATUS

In the operation of the apparatus it is contemplated that the flash tubes are pulsed repetitively at a frequency appropriate to the speed at which the recording medium 1 is being moved by a chart drive mechanism (not shown), to produce a trace 32, as seen in FIG. 13. The trace 32 in the position as shown is produced by flashing of flash tube FT4, for example, and represents a first or "zero" level of an input signal representing an analog time code being recorded.

Upon a change in the input signal condition to a second level, for example, a "one" level, the flash tube FT7 is fired to produce a trace as shown at 33 in FIG. 13. This shows the exact signal transition point on the record from the zero level to the one level. A short delay time later the flash tube FT6 is fired to produce a trace 34, thereby recording the one level. The arrangement is such that the flash tube FT6 will be pulsed repetitively until the level of the signal representing the analog time code changes to the zero level. This causes the flash tube FT7 to again be fired, as indicated by trace 35 in FIG. 13, thereby recording the transition point. After a predetermined delay, flash tube FT4 again is fired to produce touching segments as seen at 36, recording the zero level. This recurrent firing continues as long as the zero level signal condition remains.

As shown in FIG. 13, there is a possibility of a small trace over-extension when the transition occurs before the recording medium has moved beyond the last recorded one (or zero) level. Maximum overhang extension will be one-half of a segment length for the worst case situation of a transition occurring immediately after a one (or zero) level segment is recorded. The small over-extension, however, would not cause confusion since the transition line 33, for example, clearly defines the point of signal level change.

A seen in FIG. 14, a small gap between right angle segments (for example, 37 and 38) can occur due to the slit geometry. An additional separation could also occur if the signal transition level changes just prior to the required recording of a zero or one level. FIG. 15 gives a worst case illustration of both of these possibilities and the over-extension described previously. Even in the worst case, it will be seen that the apparatus arrangement illustrated clearly and precisely defines the analog time code record.

It will be apparent to those skilled in the art that dimensions and aspect ratios other than those described are possible. A limiting factor is the frequency at which the flash tubes can be repetitively triggered (above 1 KHz). The system described is operable at a maximum chart speed of 250 cm/sec. Faster recording speeds will result in spaces in the recorded analog time code using ⅛ inch segments. However, such records are very legible and are easily read. Time code at 500 cm/sec. can also be achieved using longer, for example, one-fourth inch segments. However, one-fourth inch would then become the minimum analog time code pulse width.

Flash tubes have a very long life ranging to millions of flashes. In order to maximize flash tube life and increase reliability, however, desirably the flash tubes are operated only when the drive for the recording medium is activated, that is, ON. Changes in the recording medium speed switch settings will cause modifications to the recorded analog time code aspect ratio. At very low recording medium speeds, for example, the time code trace will tend to become illegible due to longitudinal compression of the signal. In such case, however, a storage buffer can be provided to accumulate a given time signal, meanwhile ignoring successive time code signals until the one in storage is recorded, as those skilled in the art understand. Other circuitry may be provided to synchronize the recorded time code signal to the reference or time tick marks as indicated at 37 in FIG. 13, and also to provide the proper signal aspect ratio.

Thus, it may be seen that there has been provided, in accordance with the present invention, an apparatus for recording multi-level segmented data signals such as analog time codes and time reference marks, which apparatus features precise recording of the transition between zero and one levels and employs gas discharge tubes having large illuminating power and high recurrent illuminating speed. This improved recording apparatus, moreover, is inexpensive, is easily maintained, is reliable, and with more available light to the light sensitive surface of the recording medium, records dense analog time code traces, reference or time tick marks and other indicia on the recording medium.

The embodiments of the invention in which an exclusive property or privilege is claimed are defined as follows:

1. A light box matrix having a plurality of interior compartments and an exterior face in which a plurality of slits are arranged in a recording array, a plurality of flash tubes, means for mounting one of said flash tubes in individual ones of said compartments, an opaque member mounted in another of said compartments, said opaque member being configured to provide light tight isolation of said flash tubes from each other, said opaque member having a cylindrical opening therein to direct light from one of said flash tubes to pass to and through a first one of said slits, said opaque member having a first reflecting surface disposed at a first angle with respect to said cylindrical opening to reflect light from a second one of said flash tubes to and through a second one of said slits, said opaque member having a second reflecting surface disposed at a different angle with respect to said cylindrical opening to reflect light from a third one of said flash tubes to and through a third one of said slits.

2. A light box matrix as specified in claim 1 including a fourth flash tube mounted in another one of said compartments, said matrix having an opening in its side wall adjacent said exterior face whereby light from said fourth flash tube passes to and through a fourth one of said slits.

3. A light box matrix as specified in claim 1 wherein the angle between each of said first and second reflecting surfaces of said member and said cylindrical opening thereof is substantially 45°.

4. A light box matrix having a plurality of hollowed out interior spaces and an exterior face in which a plurality of slits are arranged in a recording array, a plurality of flash tubes, certain of said interior spaces each having means therein for mounting one of said flash tubes therein, a member positioned in said another one of said interior spaces and arranged to provide light tight isolation of said flash tubes from each other, said member having an opening therein to direct light from one of the flash tubes to and through an individually associated one only of the slits of said recording array, said member having a first reflecting surface to reflect light from another one of the flash tubes to and through a second and individually associated one of said slits, and said member having a second reflecting surface to reflect light from a third one of the flash tubes to and through a third and individually associated one of said slits.

5. A light box matrix as specified in claim 4 wherein three of said slits in said exterior face are arranged to provide a C-shaped recording array, and a fourth one of said slits is arranged to provide a reference mark.

6. A light box matrix as specified in claim 4 wherein said exterior face comprises a thin plate in which said slits are formed, the inboard side of each of said slits being chamfered.

* * * * *